United States Patent
Liu et al.

(10) Patent No.: US 11,048,885 B2
(45) Date of Patent: Jun. 29, 2021

(54) COGNITIVE TRANSLATION SERVICE INTEGRATED WITH CONTEXT-SENSITIVE DERIVATIONS FOR DETERMINING PROGRAM-INTEGRATED INFORMATION RELATIONSHIPS

(71) Applicant: International Business Machines Corporation, Armonk, NY (US)

(72) Inventors: Su Liu, Austin, TX (US); Denise M. Genty, Austin, TX (US); Yin Xia, Changping District (CN); Corradino Jones, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 155 days.

(21) Appl. No.: 16/140,767

(22) Filed: Sep. 25, 2018

(65) Prior Publication Data

US 2020/0097553 A1    Mar. 26, 2020

(51) Int. Cl.
  *G06F 40/58* (2020.01)
  *G06F 8/33* (2018.01)
  *G06F 8/41* (2018.01)
  *G06F 40/30* (2020.01)

(52) U.S. Cl.
  CPC ............ *G06F 40/58* (2020.01); *G06F 8/33* (2013.01); *G06F 8/427* (2013.01); *G06F 40/30* (2020.01)

(58) Field of Classification Search
  None
  See application file for complete search history.

(56) References Cited

U.S. PATENT DOCUMENTS

| 5,510,981 A | 4/1996 | Berger et al. | |
|---|---|---|---|
| 6,219,632 B1* | 4/2001 | Schumacher | G06F 40/55 704/2 |
| 7,103,875 B1* | 9/2006 | Kaneko | G06F 9/454 717/125 |
| 7,110,937 B1* | 9/2006 | Lei | G06F 40/47 704/2 |

(Continued)

OTHER PUBLICATIONS human032817 for Today "Generating a callgraph by using Doxygen and Graphviz", retrieved at: https://romanegloo.wordpress.com/2012/03/29/generating-a-callgraph-by-using-doxygen-and-graphviz-13; downloaded Jun. 12, 2020; posted on Mar. 29, 2012; 6 pgs.

(Continued)

*Primary Examiner* — Jonathan C Kim
(74) *Attorney, Agent, or Firm* — Cantor Colburn LLP; David Quinn (57) ABSTRACT

A method of cognitive translation integrated with context sensitive derivations is provided. The method is implemented via a cognitive translation engine that receives, from an integrated development environment, program-integrated information relationships with respect to a message package. The program-integrated information relationships includes the context sensitive derivations. The cognitive translation engine translates program-integrated information translation requests from a source language into a target language according to the context sensitive derivations. The program-integrated information translation requests are embedded with program-integrated information relationships.

24 Claims, 7 Drawing Sheets

(56) References Cited

U.S. PATENT DOCUMENTS

| | | | |
|---|---|---|---|
| 7,636,656 B1* | 12/2009 | Nieh | G06F 40/58 704/2 |
| 7,698,126 B2* | 4/2010 | Kohlmeier | G06F 9/454 704/8 |
| 8,170,864 B2 | 5/2012 | Huang et al. | |
| 8,892,418 B2 | 11/2014 | Anisimovich et al. | |
| 8,965,750 B2 | 2/2015 | Danielyan | |
| 9,141,606 B2 | 9/2015 | Marciano et al. | |
| 9,152,622 B2 | 10/2015 | Marcu et al. | |
| 9,367,426 B2 | 6/2016 | Park et al. | |
| 9,405,532 B1* | 8/2016 | Sullivan | G06F 9/454 |
| 9,582,294 B1* | 2/2017 | Self | G06F 9/454 |
| 9,678,951 B2 | 6/2017 | Chen et al. | |
| 2002/0107684 A1* | 8/2002 | Gao | G06F 40/279 704/4 |
| 2002/0162093 A1* | 10/2002 | Zhou | G06F 9/454 717/130 |
| 2003/0126559 A1* | 7/2003 | Fuhrmann | G06F 9/454 715/229 |
| 2003/0131320 A1* | 7/2003 | Kumhyr | G06F 9/454 715/205 |
| 2003/0154071 A1 | 8/2003 | Shreve | |
| 2004/0260532 A1 | 2/2004 | Richardson et al. | |
| 2006/0100847 A1* | 5/2006 | McEntee | G06F 40/14 704/4 |
| 2006/0206877 A1* | 9/2006 | Kohlmeier | G06F 9/454 717/137 |
| 2007/0027905 A1* | 2/2007 | Warren | G06F 8/51 |
| 2007/0118497 A1 | 5/2007 | Katoh | |
| 2008/0195377 A1 | 8/2008 | Kato et al. | |
| 2009/0327866 A1* | 12/2009 | Li | G06F 16/00 715/234 |
| 2011/0033095 A1* | 2/2011 | Hale | G06F 40/30 382/131 |
| 2011/0144972 A1* | 6/2011 | Koenig | G06F 40/58 704/2 |
| 2012/0166174 A1* | 6/2012 | Lipetskaia | G06F 40/58 704/3 |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2013/0006603 A1* | 1/2013 | Zavatone | G06F 40/58 704/2 |
| 2013/0144596 A1* | 6/2013 | Lui | G06F 40/58 704/2 |
| 2013/0311487 A1 | 11/2013 | Moore et al. | |
| 2013/0346063 A1* | 12/2013 | Chen | G06F 40/20 704/3 |
| 2014/0006004 A1* | 1/2014 | Gundepuneni | G06F 9/454 704/2 |
| 2014/0330551 A1* | 11/2014 | Bao | G06F 16/00 704/3 |
| 2015/0309993 A1* | 10/2015 | Wilde | H04L 67/02 715/703 |
| 2016/0048506 A1* | 2/2016 | Levi | G06F 40/47 704/3 |
| 2016/0162473 A1* | 6/2016 | Cogley | G06F 40/51 704/9 |
| 2016/0188576 A1 | 6/2016 | Huang | |
| 2017/0168999 A1 | 6/2017 | Chen et al. | |
| 2017/0272509 A1* | 9/2017 | Hunt | G06F 9/448 |
| 2018/0052832 A1* | 2/2018 | Anglin | G06F 40/47 |
| 2018/0081646 A1* | 3/2018 | Bugrov | G06F 9/454 |
| 2018/0225285 A1* | 8/2018 | Anglin | G06F 40/263 |
| 2018/0300218 A1* | 10/2018 | Lipka | G06F 11/3664 |
| 2018/0300318 A1* | 10/2018 | Sittel | G06F 11/362 |
| 2019/0108222 A1* | 4/2019 | Anglin | G06N 7/00 |
| 2019/0384820 A1* | 12/2019 | Liu | G06F 40/40 |
| 2020/0065224 A1* | 2/2020 | Genty | G06F 16/904 |
| 2020/0097553 A1* | 3/2020 | Liu | G06F 40/30 |

OTHER PUBLICATIONS

Tokowicz, Natasha et al. "Consequences for learning and processing", Abstract Only, full article published in: Research in Second Language Processing and Parsing; [Language Acquisition and Language Disorders 53], 2010; pp. 281-294; published online: Dec. 15, 2010; retrieved at: https://doi.org/10.1075/laid.53.12tok; 1 pg.

* cited by examiner

COGNITIVE TRANSLATION SERVICE INTEGRATED WITH CONTEXT-SENSITIVE DERIVATIONS FOR DETERMINING PROGRAM-INTEGRATED INFORMATION RELATIONSHIPS

BACKGROUND

The present invention relates to program-integrated information (PII) and, more specifically, to cognitive translation service integrated with context-sensitive derivations for determining PII relationships.

PII is information that is built into a computer program and thus conveyed to the user during execution of the program. For instance, PII messages are text strings that appear in the interface of a program. PII translation refers to the translation of PII messages into a world language other than the world language for which the program was developed, such that the program can be effectively used across various languages. PII translation is one of the most important globalization tasks (e.g. internalization and localization) in the software industry because translation enables software to be developed efficiently, in a single language, and then used across the world in other languages.

Extraction of PII messages and translation of these messages are generally performed as distinct tasks. Each entry of a PII message is assigned a key, or reference link, within the program. The PII messages themselves are copied into a resource file known as a PII message file, along with a reference to the respective key. The PII message file is translated into one or more other languages, resulting in other PII message files for the program in other languages. Thus, when the program is run in a desired language other than its native language (i.e., its first language, or the language used in the program by the development team), the PII message file corresponding to the desired language is used, and each key in the program provides a link to the appropriate translated PII message, which is dynamically displayed in the program.

SUMMARY

According to one or more embodiments, a method of cognitive translation integrated with context sensitive derivations is provided. The method is implemented via a cognitive translation engine that receives, from an integrated development environment, program-integrated information relationships with respect to a message package. The program-integrated information relationships include the context sensitive derivations. The cognitive translation engine translates program-integrated information translation requests from a source language into a target language according to the context sensitive derivations. The program-integrated information translation requests are embedded with program-integrated information relationships.

According to one or more embodiments, a computer program product for cognitive translation integrated with context sensitive derivations is provided. The computer program product includes a computer readable storage medium having program instructions of a cognitive translation engine embodied therewith. The program instructions executable by one or more processors to cause receiving program-integrated information relationships with respect to a message package. The program-integrated information relationships including the context sensitive derivations. The program instructions executable by one or more processors to cause translating one or more program-integrated information translation requests from a source language into a target language according to the context sensitive derivations. The one or more program-integrated information translation requests are embedded with program-integrated information relationships.

According to one or more embodiments, a system for cognitive translation integrated with context sensitive derivations is provided. The system including a client side including a processor and a memory storing program instructions for an integrated development environment. An on-site context sensitive derivation daemon of a program is installed in the integrated development environment. The system including a server side including one or more processor implementing a cognitive translation engine. The cognitive translation engine receives from an integrated development environment program-integrated information relationships with respect to a message package. The program-integrated information relationships includes the context sensitive derivations. The cognitive translation engine translates one or more program-integrated information translation requests from a source language into a target language according to the context sensitive derivations. The one or more program-integrated information translation requests are embedded with program-integrated information relationships.

According to one or more embodiments, a method of cognitive translation integrated with context sensitive derivations. The method being implemented via a cognitive translation engine that is executable by one or more processors. The method including translating one or more program-integrated information translation requests from a source language into a target language according to context sensitive derivations. The one or more program-integrated information translation requests re embedded with program-integrated information relationships including the context sensitive derivations. The translating including receiving the program-integrated information translation requests from the integrated development environment. Each program-integrated information translation requests including source text in context derivation structures. The source text being constructed in the source language. The translating including parsing and analyzing the context derivation structures to determine a context of the source text to produced parsed context relationships, disambiguating word meaning and word semantics of the source text based on the parsed context relationships to produce disambiguated source language text, translating the disambiguated source text into the target language to produce a translated program-integrated information item, and sending the translated program-integrated information item to the integrated development environment.

According to one or more embodiments, a method of cognitive translation integrated with context sensitive derivations. The method being implemented via an on-site context sensitive derivation daemon of a program installed in the integrated development environment that is executable by one or more processors. The method including: dynamically analyzing and determining relationships among multiple messages in a message package; generating program-integrated information relationships with respect to the message package, the program-integrated information relationships including the context sensitive derivations; and sending one or more program-integrated information translation requests for translation from a source language into a target language according to the context sensitive derivations Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, PII messages are generally translated outside the context of a program to enable efficient software development and translation. For instance, PII translation is executed in a translation tooling environment, which is separated from a real production environment. The translation tooling environment performs translation work on the independent string items saved in the PII file.

However, performing translation outside the context of the program (e.g., in a translation tooling environment) can lead to ambiguities. Translation ambiguity often occurs when a word in one language can be translated in more than one way into another language because of lacking of context information. A text or word may have totally different meanings in different context.

PII translation is usually performed, either directly or indirectly, by machine translators, although human translators are sometimes used (e.g., the string items are separately translated one by one through human or machine translation). In either case, translation ambiguity occurs when a phrase in one language translates to multiple phrases with distinct meanings in another language. For example, the word 'home' has drastically different meanings with respect to a website as opposed to a domicile. Without contextual information regarding the phrase to be translated, it can be difficult to choose the correct translation in the case of a translation ambiguity, regardless of whether the translator is a person or a machine. Clearly, lacking of context information can reduce software translation quality. And, the inappropriate translations may confuse the users, and would directly impact the customer satisfaction with products.

Turning now to an overview of the aspects of the invention, one or more embodiments of the invention address the above-described shortcomings of the prior art by determining relationships among multiple texts in PII package as context information, which can then be used as translation reference by human or machine translators. Thus, embodiments disclosed herein may include system, method, and/or computer program product (herein system) that includes a cognitive translation service integrated with context sensitive derivations for determining PII relationship. The cognitive translation service can further include an on-site context sensitive derivation daemon and a cognitive translation engine.

The on-site context sensitive derivation daemon is for analyzing and wrapping PII derivation relationships in an integrated development environment (IDE). For instance, site context sensitive derivation daemon can include a client program installed in an IDE for dynamically analyzing and determining relationships among multiple messages in a message package.

The cognitive translation engine (e.g., a Software as a Service (SaaS) application programmable interface (API) or stand-alone server) is for translating PII translation requests embedded with PII derivation relationships. For instance, the cognitive translation engine can translate the PII text from a source language into a target language according to the information of PII context derivation structure received from the client side.

Technical effects and benefits of the embodiments disclosed herein of the on-site context sensitive derivation daemon and the cognitive translation engine include enhancing search efficiency, translation accuracy, and user experiences, while dramatically reducing globalization translation costs. Thus, embodiments described herein are necessarily rooted in the system or a processor of the system to perform proactive operations to overcome problems specifically arising with the translation tooling environment. Example structural embodiments of the system is described with respect to FIGS. 1-3 in accordance with one or more embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
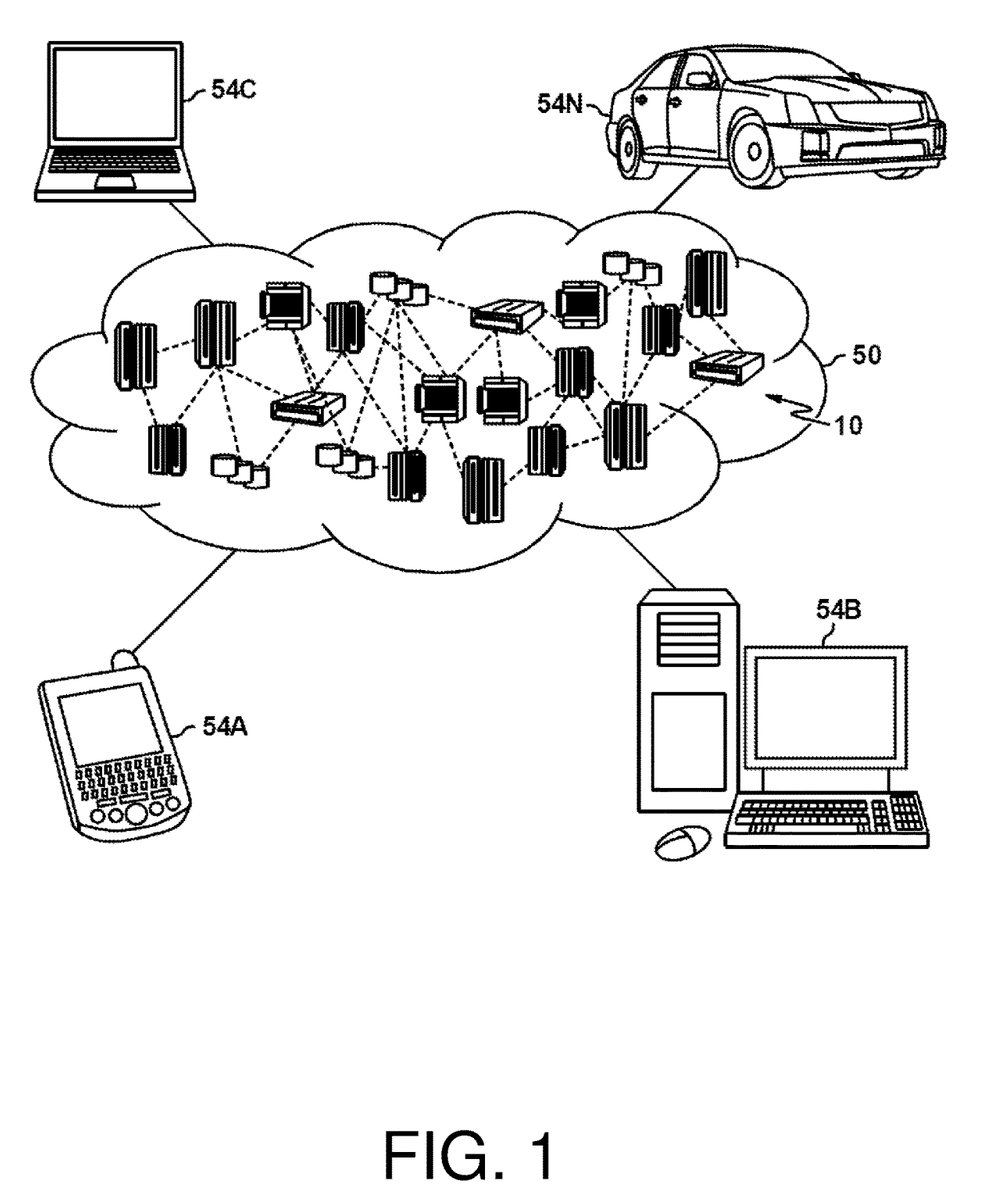
FIG. 1 depicts a cloud computing environment in accordance with one or more embodiments.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
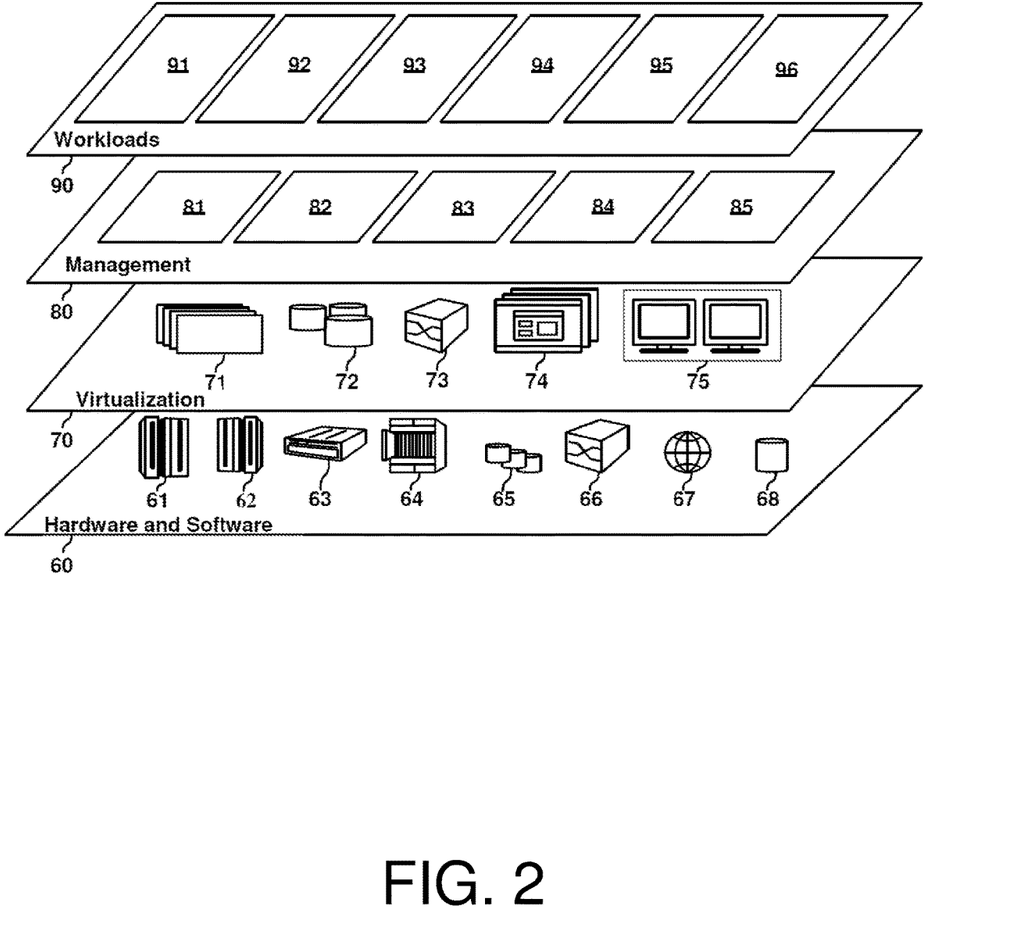
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive translation service 96.

Figure 3:
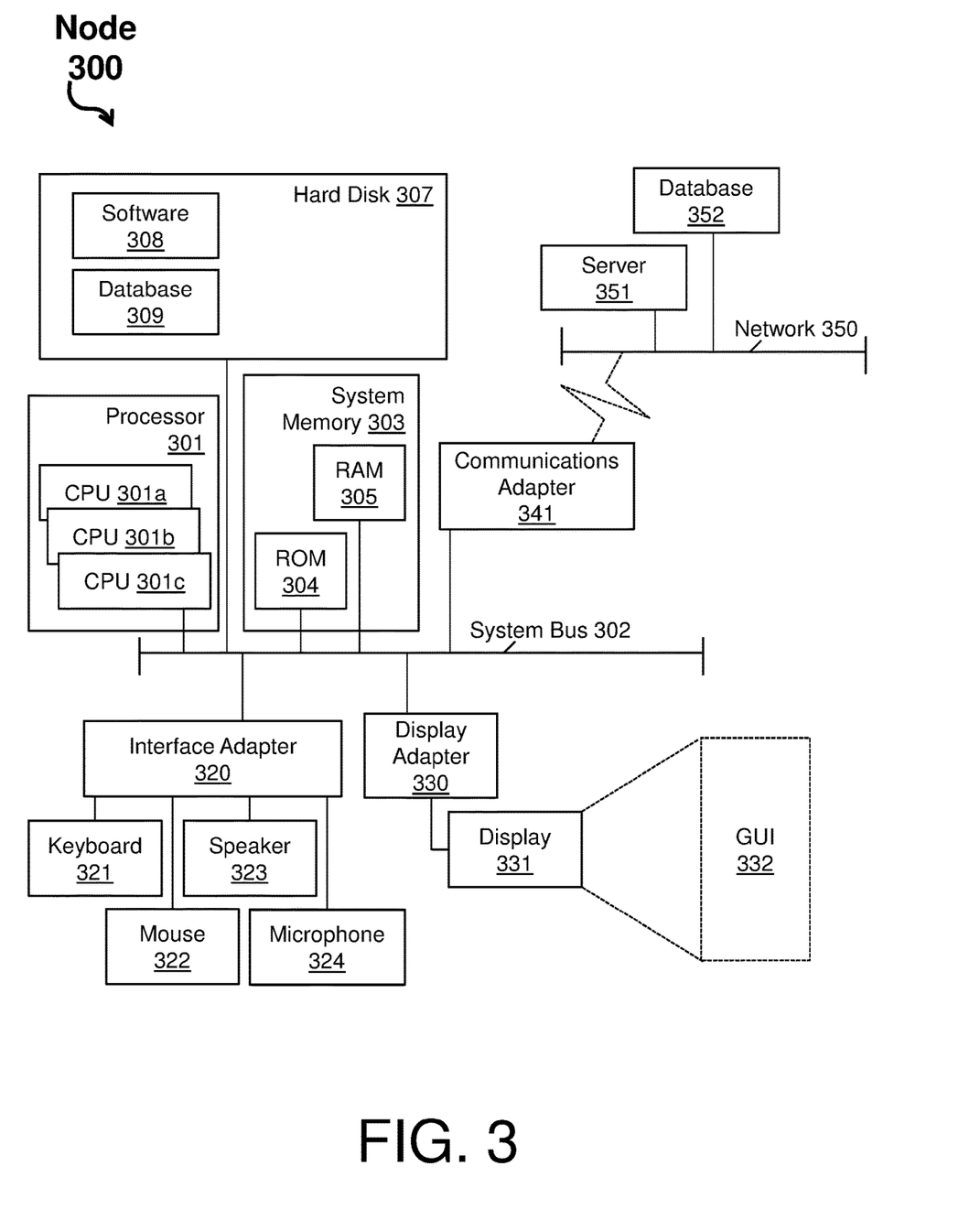
FIG. 3 depicts a processing system in accordance with one or more embodiments.

Turning now to FIG. 3, a system 300 for implementing the teachings herein is shown in according to one or more embodiments of the invention. The system 300 can represent one or more of the client and server sides of the cognitive translation service.

In this embodiment, the system 300 has a processor 301, which can include one or more central processing units (CPUs) 301a, 301b, 301c, etc. The processor 301, also referred to as a processing circuit, microprocessor, computing unit, is coupled via a system bus 302 to a system memory 303 and various other components. The system memory 303 includes read only memory (ROM) 304 and random access memory (RAM) 305. The ROM 304 is coupled to the system bus 302 and may include a basic input/output system (BIOS), which controls certain basic functions of the system 300. The RAM is read-write memory coupled to the system bus 302 for use by the processor 301.

The system 300 of FIG. 3 includes a hard disk 307, which is an example of a tangible storage medium readable executable by the processor 301. The hard disk 307 stores software 308 and data 309. The software 308 is stored as instructions for execution on the system 300 by the processor 301 (to perform a process, such as the process flows of FIGS. 6-7). The data 309 includes a set of values of qualitative or quantitative variables organized in various data structures to support and be used by operations of the software 308. The software 308 and the data 309, together or separately, can represent one or more iterations of the cognitive translation service and/or components parts (e.g., an on-site context sensitive derivation daemon and a cognitive translation engine) described herein.

The system 300 of FIG. 3 includes one or more adapters (e.g., hard disk controllers, network adapters, graphics adapters, etc.) that interconnect and support communications between the processor 301, the system memory 303, the hard disk 307, and other components of the system 300 (e.g., peripheral and external devices). In one or more embodiments of the present invention, the one or more adapters can be connected to one or more I/O buses that are connected to the system bus 302 via an intermediate bus bridge, and the one or more I/O buses can utilize common protocols, such as the Peripheral Component Interconnect (PCI).

As shown, the system 300 includes an interface adapter 320 interconnecting a keyboard 321, a mouse 322, a speaker 323, and a microphone 324 to the system bus 302. The system 300 includes a display adapter 330 interconnecting the system bus 302 to a display 331. The display adapter 330 (and/or the processor 301) can include a graphics controller to provide graphics performance, such as a display and management of a GUI 332. A communications adapter 341 interconnects the system bus 302 with a network 350 enabling the system 300 to communicate with other systems, devices, data, and software, such as a server 351 and a database 352. In one or more embodiments of the present invention, the operations of the software 308 and the data 309 can be implemented on the network 350 by the server 351 and the database 352. For instance, the network 350, the server 351, and the database 352 can combine to provide internal iterations of the software 308 and the data 309 as a platform as a service, a software as a service, and/or infrastructure as a service (e.g., as a web application in a distributed system).

Thus, as configured in FIG. 3, the operations of the software 308 and the data 309 (e.g., the system 300) are necessarily rooted in the computational ability of the processor 301 and/or the server 351 to overcome and address the herein-described shortcomings of the translation tooling environments. In this regard, the software 308 and the data 309 improve computational operations of the processor 301 and/or the server 351 of the system 300 by reducing errors in translation of PII messages that cause additional processing cycles (thereby increasing the efficiency of the system 300). Example operations of the structural embodiments of the system are described with respect to FIGS. 4-7 in accordance with one or more embodiments.

Figure 4:
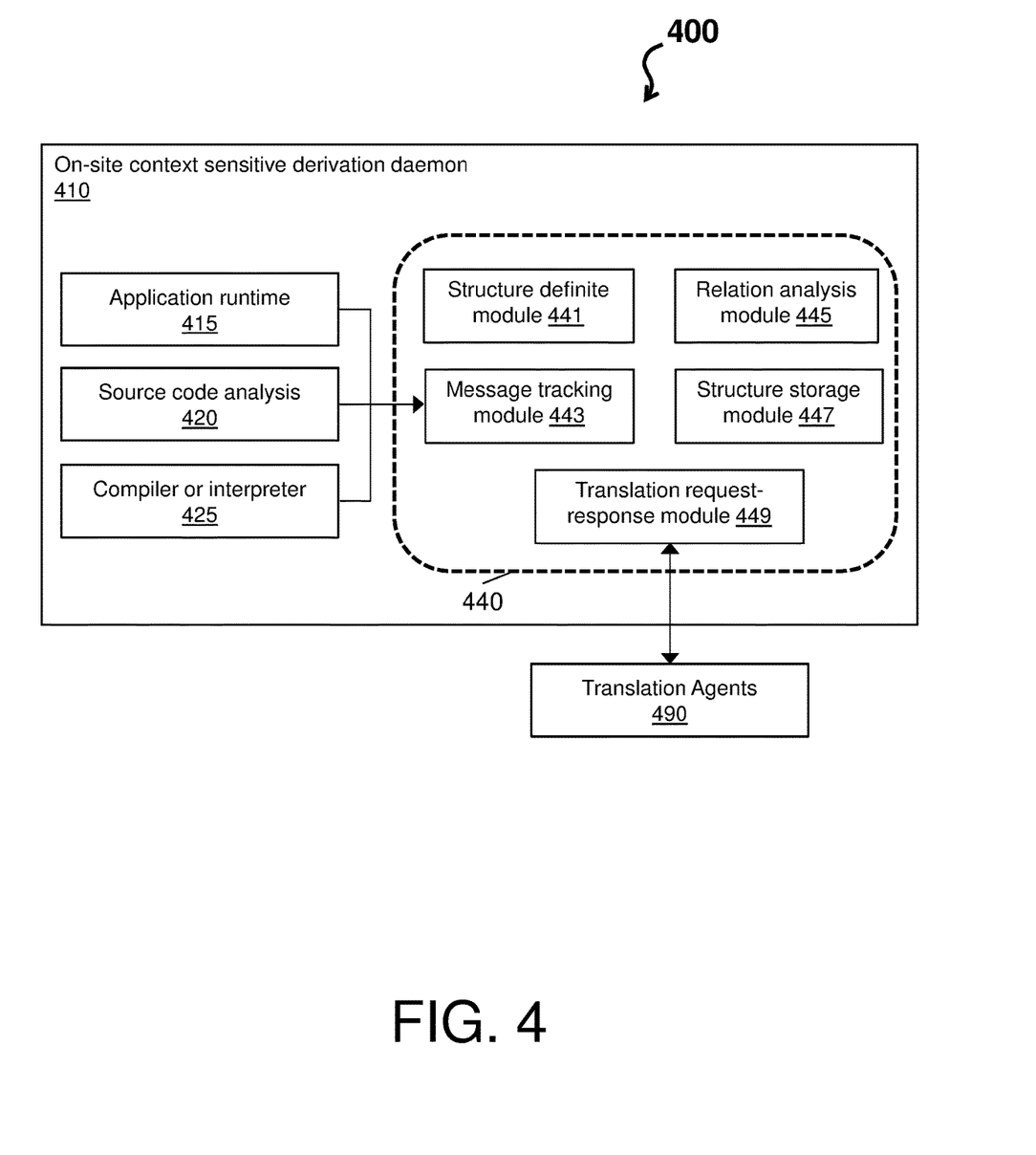
FIG. 4 depicts a client-side system architecture in accordance with one or more embodiments.

FIG. 4 depicts a client-side system architecture 400 in accordance with one or more embodiments. The client-side system architecture 400 includes an on-site context sensitive derivation daemon 410 (e.g., a software 308 of FIG. 3). In general, the on-site context sensitive derivation daemon 410 determines the relationships of the PII messages, and formats the relationships and messages to context derivation structure used for translation reference. The on-site context sensitive derivation daemon 410 is executable to provide an application runtime 415, a source code analysis 420, and a compiler or interpreter 425. The application runtime 415 implements control over an order in which work gets performed. The source code analysis 420 is a dissection of any collection of code, possibly with comments, written using a human-readable programming language, usually as plain text. The compiler or interpreter 425 are two different ways to execute a program written in a scripting or programming language. A compiler takes the entire program and converts it into object code which is typically stored in a file. An interpreter directly executes instructions written in the scripting or programming language without previously converting to an object code or machine code.

The on-site context sensitive derivation daemon 410 can also include one or more sub-programs or modules 440 that executable to provide additional operations. For instance, the modules 440 of the on-site context sensitive derivation daemon 410 can include a structure definite module 441, a message tracking module 443, a relationship analysis module 445, a structure definite module 447, and a translation request-response module 449.

The structure definite module 441 includes context derivation structures defining different data analysis. Example of the context derivation structures includes analyzing PII messages in PII display orders, PII process orders, a function processed orders, GUI component display levels, etc. Further, the context derivation structure can be defined as a table, line, tree, star, ring, mesh or other topology based on different orders or relationships. For instance, a tree structure can be used to contain messages of menu items, a table structure contains the messages of tables, and a line structure may be for messages showed on the command line. Note that multiple context derivation structures can be defined to contain messages grouped by different relationships.

The message tracking module 443 tracks PII message display orders and calling sequences. In this regard, the PII message display orders and GUI component orders can be tracked and obtained while an application is running (e.g., as shown on GUI by user actions). Further, the PII message calling sequences can be tracked and obtained through source code analysis, such as an order of invocation of java.lang.ClassLoader.getResourceAsStream( ) method (e.g., in Java source code) that can return an string stream for reading properties resource of PII message file. Furthermore, the PII message calling sequences can be tracked and obtained by a compiler during the process of compilation, or by an interpreter during the process of interpreting.

The relationship analysis module 445 determines the relationships of the PII messages. The obtained PII message calling sequences can be analyzed in this module and process. The relationships of the PII messages can be determined by analyzing display orders and GUI component orders, which may include the display orders of messages and GUI components according to user actions, the layout of messages and GUI components, and the properties of messages and GUI components. The PII message calling sequences and logical message processing orders can be used to facilitate the relationship determination of the PII messages. Natural language processing services can be used to analyze the meaning of PII messages to facilitate the relationship determination.

The structure definite module 447 saves the determined relationships to context derivation structure. A correlated context derivation structure can be selected from the structure definite module 447 to save the messages and their relationships determined by the relationship analysis module 445. The structure definite module 447 can attach additional information (e.g. correlated GUI levels) to generated context derivation structure.

The translation request-response module 449 monitors and responds to translation requests. The translation requests can be from a cognitive translation engine. The messages, correlated context derivation structure and attached information can be sent to the translation agent as translation reference 490.

Figure 5:
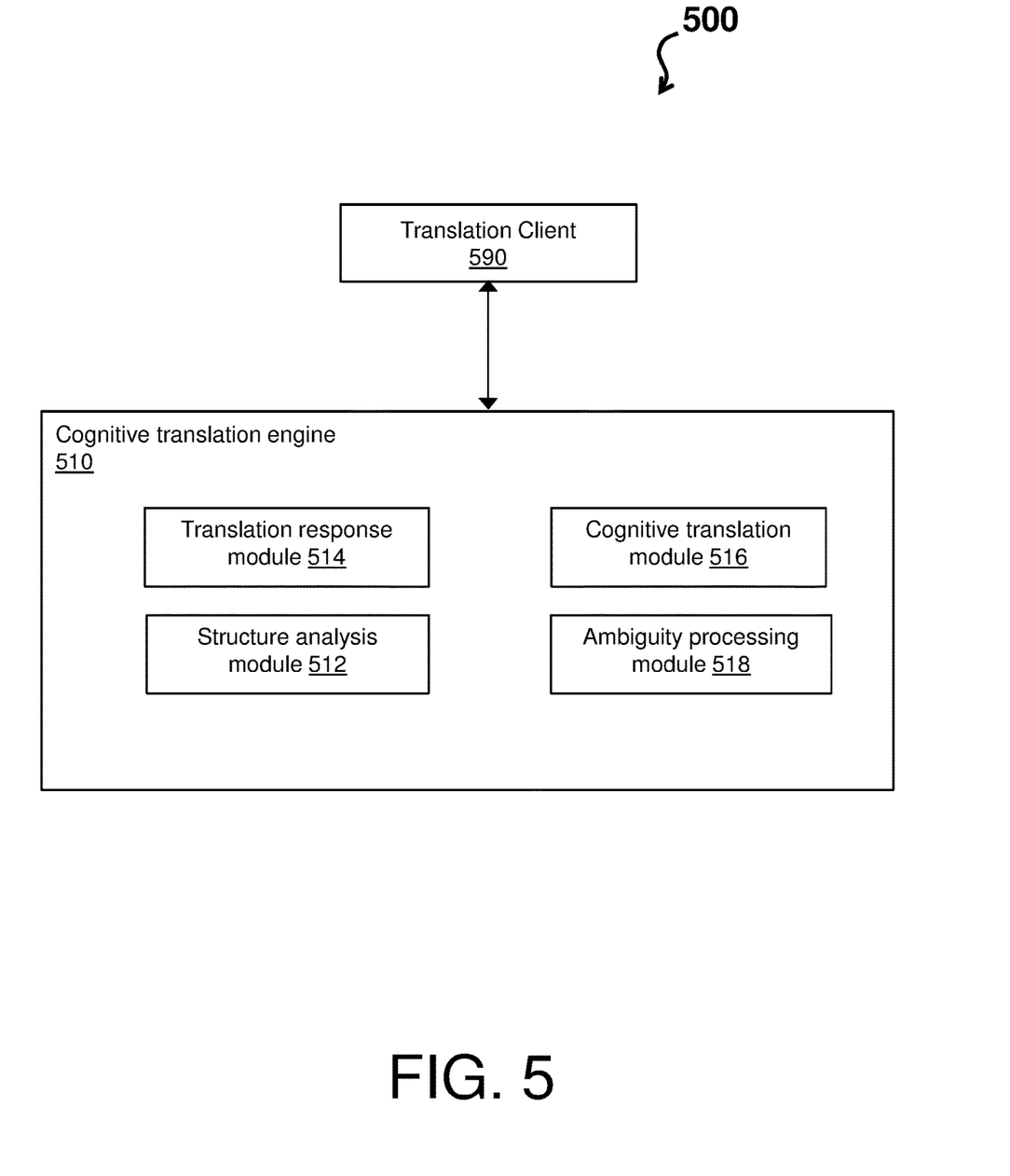
FIG. 5 depicts a server-side system architecture in accordance with one or more embodiments.

FIG. 5 depicts a server-side system architecture 500 in accordance with one or more embodiments. The server-side system architecture 500 includes a cognitive translation engine 510 (e.g., a software 308 of FIG. 3). In general, the cognitive translation engine 510 translates the text from a source language into a target language based on the information of PII context derivation structure received from the client side, such as a translation client 590 (e.g., translation request-response module 449 in FIG. 4), to improve the accuracy of PII translation. The cognitive translation engine 510 can include one or more sub-programs or modules that executable to provide specific operations. For instance, the modules of the cognitive translation engine 510 can include a structure analysis module 512, a translation response module 514, a cognitive translation module 516, and an ambiguity processing module 518.

The structure analysis module 512 analyzes context derivation structures. The structure analysis module 512 also chooses a proper analysis approach according to a topology category of the context derivation structure, such as table, line, tree, star, ring, mesh or others. The structure analysis module 512 analyzes relationships of PII contents included in the context derivation structure, which may include global relationship, parent-child relationship, peer relationship and neighboring relationship. The structure analysis module 512 determines the context of the source language text based on the relationships of the PII contents in context derivation structure.

The translation response module 514 receives translation requests from clients, which include source language text and context derivation structures, responds to the translation requests, and sends/returns translation outputs to the clients.

The cognitive translation module 516 executes the translation processing preprocess the source language text to identify the words or sentences with ambiguous word meaning and semantics. The cognitive translation module 516 requests the ambiguity processing module 518 to analyze and determine the word meaning and semantics, when the unique meaning of a word cannot be determined by cognitive translation module 516. The cognitive translation module 516 generates a final translation output in target language after disambiguating the word meaning and semantics by the ambiguity processing module 518.

The ambiguity processing module 518 disambiguates word meanings and semantics. The ambiguity processing module 518 receives processing request from the cognitive translation module 516. For instance, the ambiguity processing module 518 analyzes the context information received from the structure analysis module 512 to determine the word meaning and semantics, and returns back corresponding processing result to the cognitive translation module 516 for use in subsequent translation work.

Figure 6:
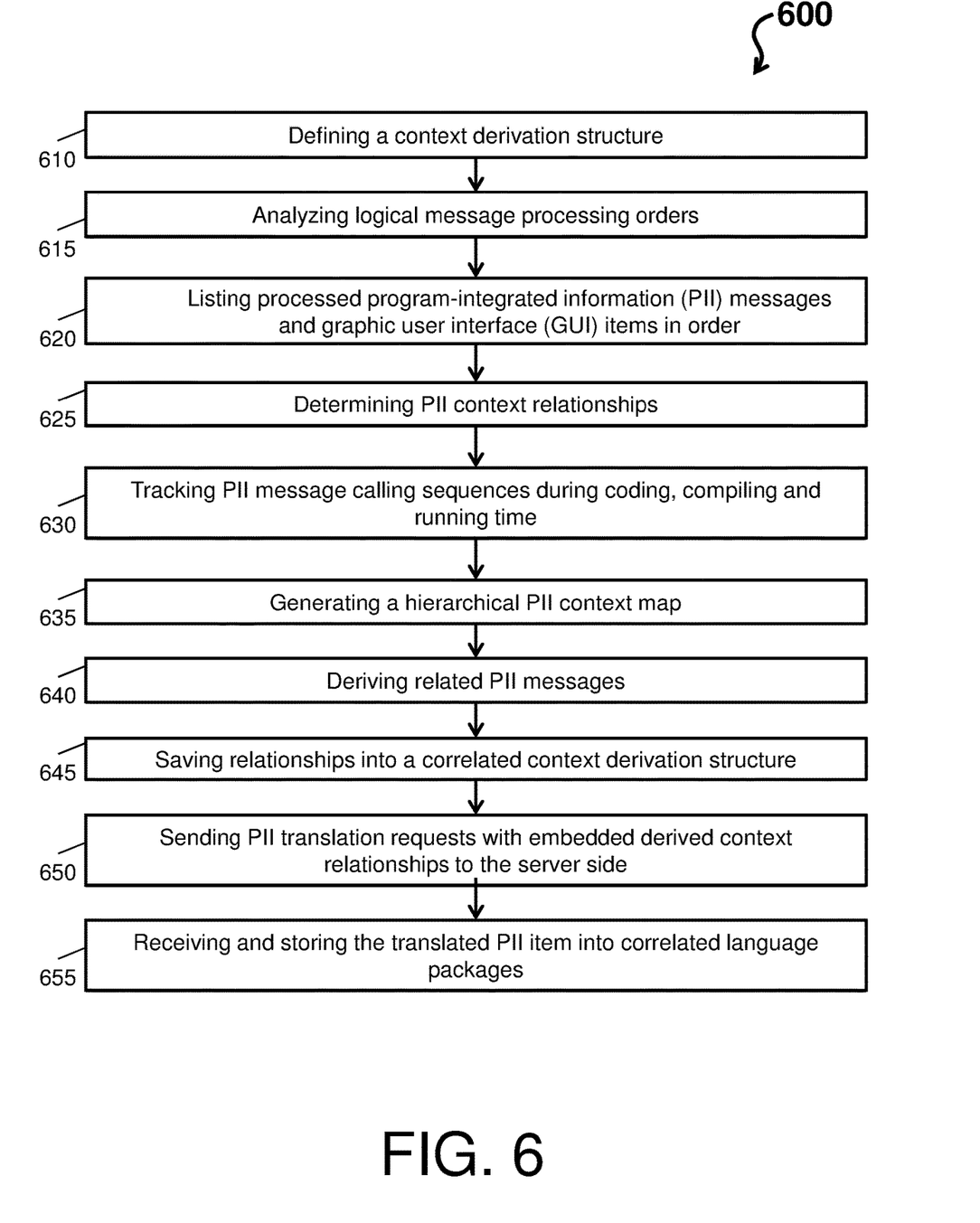
FIG. 6 depicts a process flow in accordance with one or more embodiments.

FIG. 6 depicts a process flow 600 in accordance with one or more embodiments. The process flow 600 is an example operation of the on-site context sensitive derivation daemon 410 of FIG. 4 where client program installed in the IDE for dynamically analyzing and determining relationship among multiple messages in a message package. The process flow 600 can interact with a server-side (e.g., the cognitive translation engine 510 of FIG. 5).

At block 610, the on-site context sensitive derivation daemon 410 defines a context derivation structure. The context derivation structure can reflect PII display orders, PII process orders, function processed orders, graphic user interface (GUI) component display levels, etc., as discussed herein. At block 615, the on-site context sensitive derivation daemon 410 analyzes logical message processing orders, which may result in processed PII messages.

At block 620, the on-site context sensitive derivation daemon 410 lists the processed PII messages and any GUI items in order. At block 625, the on-site context sensitive derivation daemon 410 determines PII context relationships. At block 630, the on-site context sensitive derivation daemon 410 tracks PII message calling sequences during coding, compiling, and running time.

At block 635, the on-site context sensitive derivation daemon 410 generates a hierarchical PII context map and, at block 640, derives related PII messages. At block 645, the on-site context sensitive derivation daemon 410 saving relationships (e.g., the related PII messages with respect to the hierarchical PII context map) into a correlated context derivation structure (e.g., context sensitive derivations).

At block 650, the on-site context sensitive derivation daemon 410 sends PII translation requests embedded with derived context relationships to the server side. At block 655, the on-site context sensitive derivation daemon 410 receives and stores the translated PII item into correlated language packages.

Figure 7:
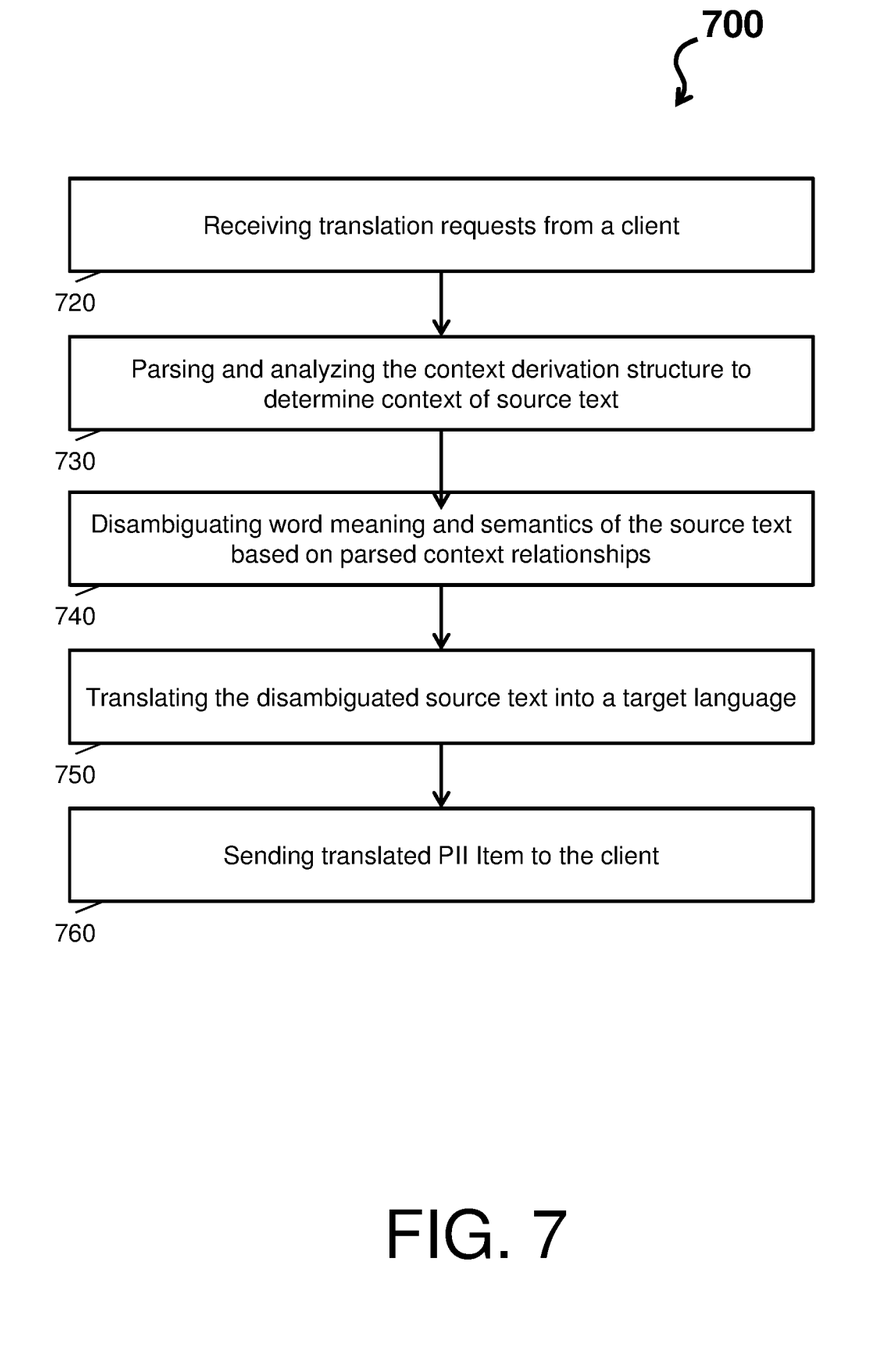
FIG. 7 depicts a process flow in accordance with one or more embodiments.

FIG. 7 depicts a process flow 700 in accordance with one or more embodiments. The process flow 700 is an example operation of the cognitive translation engine 510 of FIG. 5 where PII text of a message package is translated from a source language into a target language according to the information of PII context derivation structure received from the client side (e.g., the on-site context sensitive derivation daemon 410 of FIG. 4 in an integrated development environment).

At block 720, the cognitive translation engine 510 receives the translation requests (e.g., PII translation requests) from the client. Note that each PII translation request (e.g., a PII item) includes the source language text with context derivation structures.

At block 730, the cognitive translation engine 510 parses and analyzes the context derivation structure to determine a context of the source language text. The cognitive translation engine 510, in turn, produces parsed context relationships. At block 740, the cognitive translation engine 510 disambiguates word meaning and semantics of the source text based on the parsed context relationships. The cognitive translation engine 510, in turn, produces disambiguated source language text.

At block 750, the cognitive translation engine 510 translates the disambiguated source language text into a target language. The cognitive translation engine 510, in turn, produces a translated PII item. At block 760, the cognitive translation engine 510 sends the translated PII Item to the client.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of cognitive translation integrated with context sensitive derivations, the method being implemented via a cognitive translation engine that is executable by one or more processors, the method comprising:
   receiving, by the cognitive translation engine from an integrated development environment, program-integrated information relationships with respect to a message package, the program-integrated information relationships comprising the context sensitive derivations, the program-integrated information relationships comprising relationships between program-integrated information (PII) messages in the message package; and
   translating, by the cognitive translation engine, one or more program-integrated information translation requests from a source language into a target language according to the context sensitive derivations, the one or more program-integrated information translation requests being embedded with program-integrated information relationships, wherein translating comprises deriving a context of an ambiguous word based on parsed context relationships within a source text, and wherein translating further comprises selecting an analytical approach based at least in part on a topological category within the message package.

2. The method of claim 1, wherein the cognitive translation engine is executable by the one or more processors of a stand-alone server or is executable by a software as a server application programmable interface utilizing the one or more processors.

3. The method of claim 1, the translating of the one or more program-integrated information translation requests comprises:
   receiving the program-integrated information translation requests from the integrated development environment, each program-integrated information translation requests including the source text in context derivation structures, the source text being constructed in the source language.

4. The method of claim 3, the translating of the one or more program-integrated information translation requests comprises:
   parsing and analyzing the context derivation structures to determine a context of the source text to produced parsed context relationships.

5. The method of claim 4, the translating of the one or more program-integrated information translation requests comprises:

disambiguating word meaning and word semantics of the source text based on the parsed context relationships to produce disambiguated source language text.

6. The method of claim 5, the translating of the one or more program-integrated information translation requests comprises:
   translating the disambiguated source text into the target language to produce a translated program-integrated information item.

7. The method of claim 6, the translating of the one or more program-integrated information translation requests comprises:
   sending the translated program-integrated information item to the integrated development environment.

8. The method of claim 1, wherein an on-site context sensitive derivation daemon of a program installed in the integrated development environment dynamically analyzes and determines relationships among multiple messages in the message package.

9. The method of claim 8, wherein the on-site context sensitive derivation daemon generates a hierarchical program-integrated information (PII) context map, derives related PII messages, saves the related PII messages with respect to the hierarchical PII context map as the context sensitive derivations, and embeds the program-integrated information relationships with the context sensitive derivations.

10. The method of claim 8, wherein the on-site context sensitive derivation daemon defines a context derivation structures according to program-integrated information display orders, program-integrated information process orders, function processed orders, or graphic user interface component display levels.

11. A computer program product for cognitive translation integrated with context sensitive derivations, the computer program product comprising a computer readable storage medium having program instructions of a cognitive translation engine embodied therewith, the program instructions executable by one or more processors to cause:
   receiving, by the cognitive translation engine from an integrated development environment, program-integrated information relationships with respect to a message package, the program-integrated information relationships comprising the context sensitive derivations, the program-integrated information relationships comprising relationships between program-integrated information (PII) messages in the message package; and
   translating, by the cognitive translation engine, one or more program-integrated information translation requests from a source language into a target language according to the context sensitive derivations, the one or more program-integrated information translation requests being embedded with program-integrated information relationships, wherein translating comprises deriving a context of an ambiguous word based on parsed context relationships within a source text, and wherein translating further comprises selecting an analytical approach based at least in part on a topological category within the message package.

12. The computer program product of claim 11, wherein the cognitive translation engine is executable by the one or more processors of a stand-alone server or is executable by a software as a server application programmable interface utilizing the one or more processors.

13. The computer program product of claim 11, the translating of the one or more program-integrated information translation requests comprises:
   receiving the program-integrated information translation requests from the integrated development environment, each program-integrated information translation requests including source text in context derivation structures, the source text being constructed in the source language.

14. The computer program product of claim 13, the translating of the one or more program-integrated information translation requests comprises:
   parsing and analyzing the context derivation structures to determine a context of the source text to produced parsed context relationships.

15. The computer program product of claim 14, the translating of the one or more program-integrated information translation requests comprises:
   disambiguating word meaning and word semantics of the source text based on the parsed context relationships to produce disambiguated source language text.

16. The computer program product of claim 15, the translating of the one or more program-integrated information translation requests comprises:
   translating the disambiguated source text into the target language to produce a translated program-integrated information item.

17. The computer program product of claim 16, the translating of the one or more program-integrated information translation requests comprises:
   sending the translated program-integrated information item to the integrated development environment.

18. The computer program product of claim 11, wherein an on-site context sensitive derivation daemon of a program installed in the integrated development environment dynamically analyzes and determines relationships among multiple messages in the message package.

19. The computer program product of claim 18, wherein the on-site context sensitive derivation daemon generates a hierarchical program-integrated information (PII) context map, derives related PII messages, saves the related PII messages with respect to the hierarchical PII context map as the context sensitive derivations, and embeds the program-integrated information relationships with the context sensitive derivations.

20. The computer program product of claim 18, wherein the on-site context sensitive derivation daemon defines a context derivation structures according to program-integrated information display orders, program-integrated information process orders, function processed orders, or graphic user interface component display levels.

21. A system for cognitive translation integrated with context sensitive derivations, the system comprising:
   a client side comprising a processor and a memory storing program instructions for an integrated development environment, an on-site context sensitive derivation daemon of a program being installed in the integrated development environment; and
   a server side comprising one or more processor implementing a cognitive translation engine,
   wherein the cognitive translation engine receives from an integrated development environment program-integrated information relationships with respect to a message package, the program-integrated information relationships comprising the context sensitive derivations, the program-integrated information relationships comprising relationships between program-integrated information (PII) messages in the message package, and
   wherein the cognitive translation engine translates one or more program-integrated information translation requests from a source language into a target language according to the context sensitive derivations, the one or more program-integrated information translation requests being embedded with program-integrated information relationships, wherein translating comprises deriving a context of an ambiguous word based on parsed context relationships within a source text, and wherein translating further comprises selecting an analytical approach based at least in part on a topological category within the message package.

22. The system of claim 21, wherein the cognitive translation engine is executable by the one or more processors of a stand-alone server or is executable by a software as a server application programmable interface utilizing the one or more processors.

23. The system of claim 21, wherein the translation of the one or more program-integrated information translation requests comprises receiving the program-integrated information translation requests from the integrated development environment, each program-integrated information translation requests including source text in context derivation structures, the source text being constructed in the source language.

24. A method of cognitive translation integrated with context sensitive derivations, the method being implemented via a cognitive translation engine that is executable by one or more processors, the method comprising:
translating, by the cognitive translation engine, one or more program-integrated information translation requests from a source language into a target language according to context sensitive derivations, the one or more program-integrated information translation requests being embedded with program-integrated information relationships comprising the context sensitive derivations, the translating comprising:
receiving the program-integrated information translation requests from the integrated development environment, each program-integrated information translation requests including source text in context derivation structures, the source text being constructed in the source language,
parsing and analyzing the context derivation structures to determine a context of the source text to produced parsed context relationships,
disambiguating word meaning and word semantics of the source text based on the parsed context relationships to produce disambiguated source language text,
translating the disambiguated source text into the target language to produce a translated program-integrated information item, wherein translating comprises deriving a context of an ambiguous word based on parsed context relationships within a source text, and wherein translating further comprises selecting an analytical approach based at least in part on a topological category within a message package, the program-integrated information relationships comprising relationships between program-integrated information (PII) messages in the message package, and
sending the translated program-integrated information item to the integrated development environment.

* * * * *